(12) United States Patent
Nalbant et al.

(10) Patent No.: US 11,799,330 B2
(45) Date of Patent: Oct. 24, 2023

(54) ENHANCED WIRELESS POWER TRANSFER

(71) Applicant: Apple Inc., Cupertino, CA (US)

(72) Inventors: Mehmet K. Nalbant, Cupertino, CA (US); Alireza Safaee, Cupertino, CA (US); Jukka-pekka J. Sjoeroos, Cupertino, CA (US); Zaid A. AbuKhalaf, San Jose, CA (US); Juan Carlos Pastrana, Chandler, AZ (US); Alexei E. Kosut, Campbell, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 17/381,929

(22) Filed: Jul. 21, 2021

(65) Prior Publication Data

US 2022/0060060 A1 Feb. 24, 2022

Related U.S. Application Data

(63) Continuation of application No. 17/122,727, filed on Dec. 15, 2020, now Pat. No. 11,081,911.

(60) Provisional application No. 63/068,768, filed on Aug. 21, 2020.

(51) Int. Cl.
| | |
|---|---|
| *H02J 7/00* | (2006.01) |
| *H02J 7/02* | (2016.01) |
| *H02J 50/80* | (2016.01) |
| *H02J 50/12* | (2016.01) |
| *H04W 4/80* | (2018.01) |
| *H04W 12/06* | (2021.01) |
| *H04B 5/00* | (2006.01) |
| *H02J 50/10* | (2016.01) |

(52) U.S. Cl.
CPC ............. *H02J 50/80* (2016.02); *H02J 50/10* (2016.02); *H04B 5/0031* (2013.01); *H04B 5/0037* (2013.01)

(58) Field of Classification Search
None
See application file for complete search history.

(56) References Cited

U.S. PATENT DOCUMENTS

| | | | | |
|---|---|---|---|---|
| 9,160,421 B2* | 10/2015 | Kim | ........................ | H02J 50/80 |
| 9,866,073 B2* | 1/2018 | Joye | ........................ | H02J 50/12 |
| 9,912,194 B2* | 3/2018 | Jung | ........................ | H02J 50/50 |
| 10,243,620 B2* | 3/2019 | Won | ........................ | H02J 50/90 |
| 10,734,843 B2* | 8/2020 | Joye | ........................ | H02J 50/12 |
| 10,742,051 B2* | 8/2020 | Colosimo | ............. | H02J 7/0048 |
| 10,749,384 B2* | 8/2020 | Park | ........................ | H02J 50/90 |
| 10,790,693 B2* | 9/2020 | Bae | ........................ | H02J 50/80 |

(Continued)

OTHER PUBLICATIONS

International Search Report & Written Opinion for PCT Application No. PCT/US2021/042928 dated Nov. 3, 2021; 14 pgs.

*Primary Examiner* — Tuan A Tran
(74) *Attorney, Agent, or Firm* — FLETCHER YODER PC

(57) ABSTRACT

Wireless power transfer devices may be configured to negotiate with each other to operate. For example, a wireless power standard may provide for various levels of power delivery, various frequencies for power transfer, various operating voltages, and so forth. There may be instances in which it is desirable to provide wireless power transfer devices (both PTx and PRx) that are capable of enhanced performance when paired with a compatible device. For example, devices can be configured to operate at higher or more granular power levels, different frequencies, and so forth.

21 Claims, 5 Drawing Sheets

(56) References Cited

U.S. PATENT DOCUMENTS

| | | | | |
|---|---|---|---|---|
| 10,804,728 B2* | 10/2020 | Kim | ............... | H02J 7/00034 |
| 10,809,343 B2* | 10/2020 | Lee | ............... | H02J 50/90 |
| 10,855,099 B2* | 12/2020 | Kim | ............... | H02J 7/342 |
| 10,868,446 B2* | 12/2020 | Muratov | ............... | H02J 7/025 |
| 10,965,144 B2* | 3/2021 | Oh | ............... | H02J 50/60 |
| 10,985,615 B2* | 4/2021 | Park | ............... | H02J 50/70 |
| 11,139,859 B2* | 10/2021 | Staring | ............... | H04B 5/0031 |
| 11,271,432 B2* | 3/2022 | Bae | ............... | H02J 7/00714 |
| 11,277,037 B2* | 3/2022 | Kim | ............... | H02J 50/20 |
| 11,451,094 B2* | 9/2022 | Joye | ............... | H02J 50/12 |
| 11,594,916 B2* | 2/2023 | Oh | ............... | H02J 50/12 |
| 2011/0127845 A1 | 6/2011 | Walley et al. | | |
| 2017/0324279 A1* | 11/2017 | Kang | ............... | H02J 7/025 |
| 2017/0353055 A1* | 12/2017 | Han | ............... | H02J 7/025 |
| 2018/0034305 A1* | 2/2018 | Lee | ............... | H02J 7/007192 |
| 2018/0152051 A1* | 5/2018 | Kim | ............... | H02M 1/36 |
| 2018/0309314 A1* | 10/2018 | White, II | ............... | H02J 50/40 |
| 2019/0235041 A1* | 8/2019 | Lee | ............... | H02J 50/90 |
| 2019/0245373 A1* | 8/2019 | Oh | ............... | H02J 50/80 |
| 2019/0312469 A1 | 10/2019 | Shichino | | |
| 2019/0379425 A1* | 12/2019 | Lee | ............... | H02J 7/025 |
| 2020/0091780 A1* | 3/2020 | Lee | ............... | H02J 7/025 |
| 2020/0266650 A1* | 8/2020 | Cho | ............... | H02J 50/80 |
| 2021/0050749 A1* | 2/2021 | Muratov | ............... | H02J 50/12 |

* cited by examiner

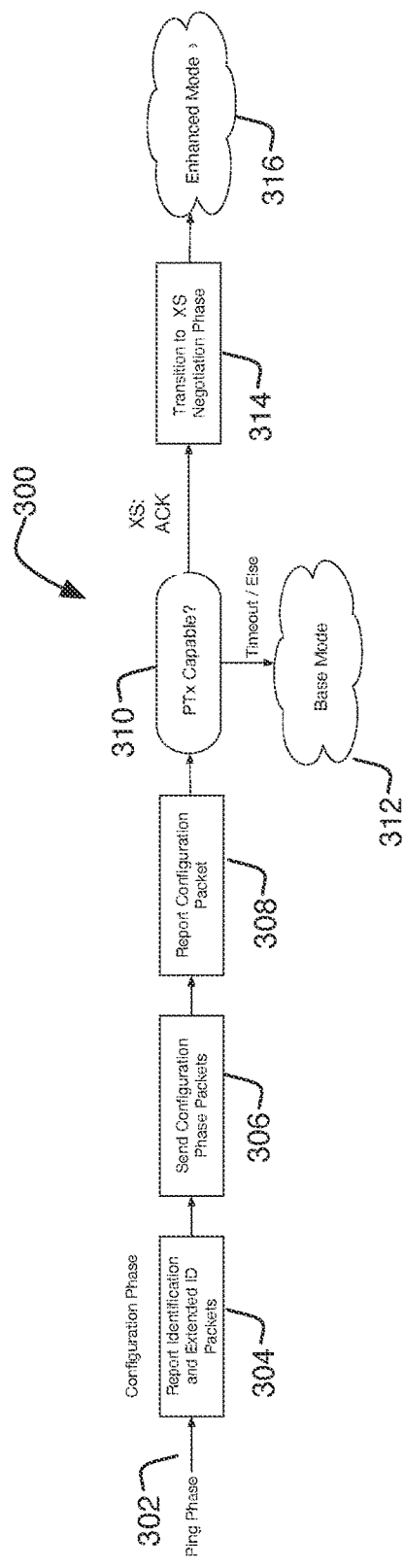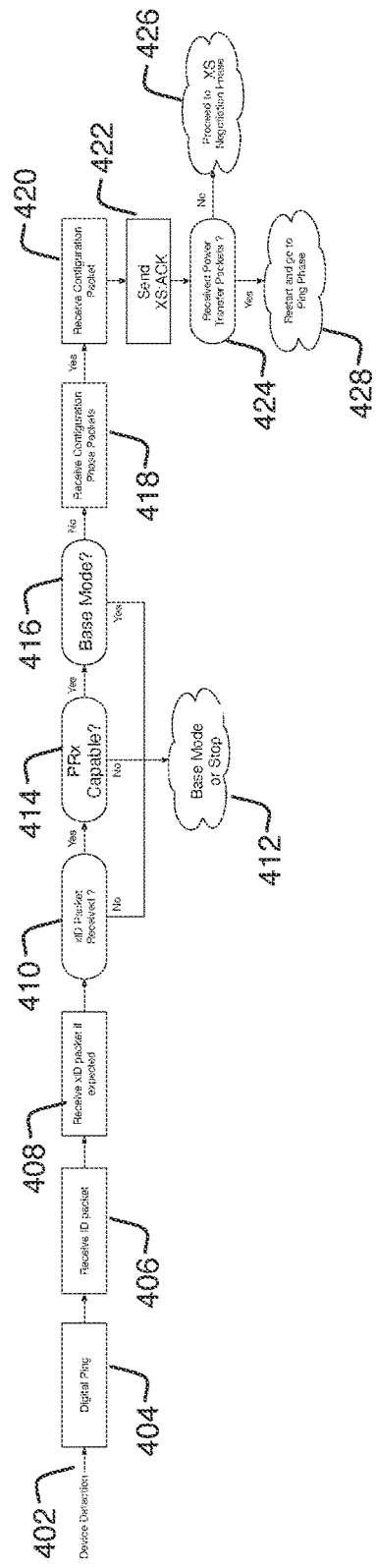
FIG. 3
FIG. 4

ENHANCED WIRELESS POWER TRANSFER

BACKGROUND

Wireless power transfer ("WPT"), sometimes also known as inductive power transfer ("IPT") has recently become more prevalent in a number of applications. One application in which WPT/IPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.).

SUMMARY

In some embodiments, a wireless power receiver is capable of negotiating with a power transmitter in a standards-compliant way to operate in a manner that is beyond the scope of the standard.

A wireless power receiver can include a receiver coil configured to receive power from a wireless power transmitter, a rectifier coupled to the receiver coil configured to convert an AC voltage appearing across the receiver coil to a DC voltage delivered to a load, and a control and communications module coupled to the receiver coil and the rectifier. The controller and communications module may be further configured to receive in-band communication signals from the wireless power transmitter via the receiver coil and operate the rectifier to generate in-band communication signals delivered to the power transmitter via the receiver coil. The in-band communication signals can include communications in compliance with a standard communication protocol negotiating a transition to an enhanced or extended operating mode. The enhanced or extended operating mode can include operating at one or more of a frequency and a power level different than a frequency or power level prescribed by the standard communication protocol.

The wireless power receiver can further include an NFC communication module coupled to the control and communication module. In that case, the enhanced or extended operating mode can include delaying wireless power transfer to permit NFC communication with a corresponding NFC communication module in the wireless power transmitter. The communication in compliance with a standard communication protocol negotiating a transition to an enhanced or extended operating mode can include communications indicating one or more enhanced capabilities of the receiver. The communication in compliance with a standard communication protocol negotiating a transition to an enhanced or extended operating mode can further include communications requesting one or more enhanced capabilities of the transmitter. The communication in compliance with a standard communication protocol negotiating a transition to an enhanced or extended operating mode can still further include communications acknowledging one or more enhanced capabilities of the transmitter. The communication in compliance with a standard communication protocol negotiating a transition to an enhanced or extended operating mode can also include communications relating to a user interface capability of at least one of the transmitter and receiver.

A wireless power transmitter can include a transmitter coil configured to deliver power to a wireless power receiver, an inverter coupled to the transmitter coil configured to convert an input voltage into an AC voltage delivered to the transmitter coil, and a control and communications module coupled to the transmitter coil and the inverter. The controller and communications module may be further configured to receive in-band communication signals from the wireless power receiver via the transmitter coil and operate the inverter to generate in-band communication signals delivered to the power received via the transmitter coil. The in-band communication signals can include communications in compliance with a standard communication protocol negotiating a transition to an enhanced or extended operating mode. The enhanced or extended operating mode can include operating at a frequency or power level different than a frequency or power level prescribed by the standard communication protocol.

The wireless power transmitter can further include an NFC communication module coupled to the control and communication module. In that case, the enhanced or extended operating mode can include delaying wireless power transfer to permit NFC communication with a corresponding NFC communication module in the wireless power receiver. The communication in compliance with a standard communication protocol can include negotiating a transition to an enhanced or extended operating mode include communications indicating one or more enhanced capabilities of the transmitter. The communication in compliance with a standard communication protocol negotiating a transition to an enhanced or extended operating mode can further include communications requesting one or more enhanced capabilities of the receiver. The communication in compliance with a standard communication protocol negotiating a transition to an enhanced or extended operating mode can still further include communications acknowledging one or more enhanced capabilities of the receiver. The communication in compliance with a standard communication protocol negotiating a transition to an enhanced or extended operating mode can also include communications relating to a user interface capability of at least one of the transmitter and receiver.

A method of negotiating wireless power transfer between a wireless power transmitter or a wireless power receiver and a counterpart device can include initiating communication with the counterpart device using a standard communication protocol, communicating one or more enhanced capabilities of the device to the counterpart device using the standard communication protocol, and determining whether the counterpart device is also capable of operating in accordance with each of the one or more enhanced capabilities. If the counterpart device is not capable of operating in accordance with one or more of the enhanced capabilities, the method can further include operating in a standard mode. Alternatively, if the counterpart device is capable of operating in accordance with one or more of the enhanced capabilities, the method can further include negotiating a transition to an agreed enhanced mode including one or more of the enhanced capabilities. The communications between the device and its counterpart may be in-band or out-of-band communications. The enhanced capabilities may include an ability to operate at a frequency or power level different than a frequency or power level prescribed by the standard communication protocol. The enhanced capabilities may include NFC communications capabilities and the enhanced mode includes delaying wireless power transfer to permit NFC communication. The enhanced capabilities may also include user interface capabilities of the transmitter or receiver device, in which case the agreed enhanced mode can include an agreement between the device and its counterpart as to which device will provide information about a state of wireless power transfer to a user.

BRIEF DESCRIPTION OF THE DRAWINGS

FIG. 3 illustrates a flow chart of a receiver-side negotiation for an enhanced/extended wireless power transfer mode.

FIG. 4 illustrates a flow chart of a transmitter-side negotiation for an enhanced/extended wireless power transfer mode.

DETAILED DESCRIPTION

Figure 1:
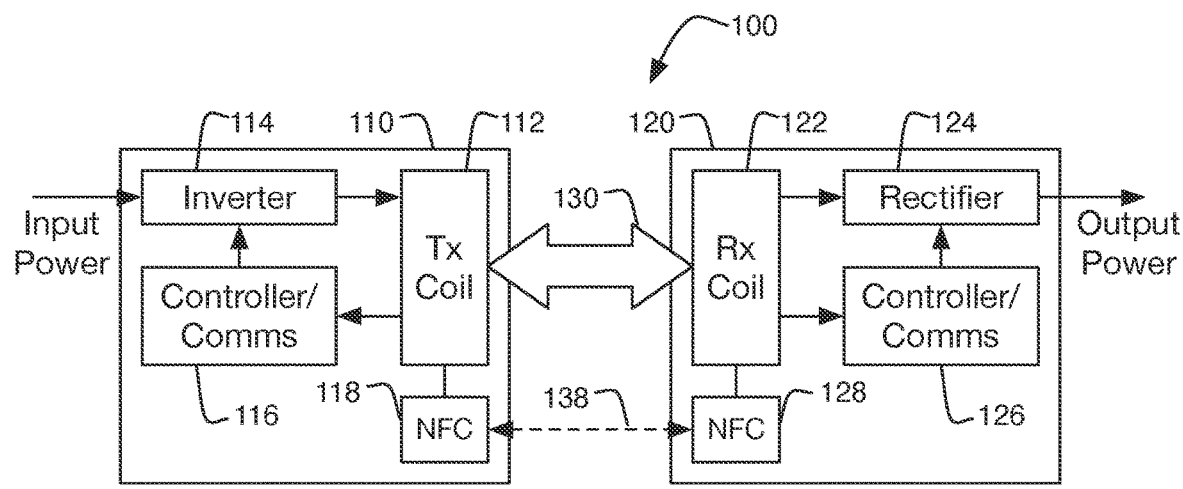
FIG. 1 illustrates a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that wirelessly transfers power to a power receiver (PRx) 120 via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information, and may instruct the inverter to modulate the delivered power by manipulating various parameters (such as voltage, frequency, phase, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a near field communications ("NFC") module 118. In some embodiments, NFC module 118 may communicate with a corresponding module or radio frequency identification (RFID) tag in the PRx via the power transfer coils. In other embodiments, NFC module 118 may communicate with a corresponding module or tag using a separate physical channel 138. In some embodiments, as described in greater detail below, it may be necessary to suspend inductive power transfer to prevent interference with NFC communications.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as an winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a near field communications ("NFC") module 128. In some embodiments, NFC module 128 may communicate with a corresponding module or radio frequency identification (RFID) tag in the PTx via the power transfer coils. In other embodiments, NFC module 128 may communicate with a corresponding module or tag using a separate physical channel 138. In some embodiments, as described in greater detail below, it may be necessary to suspend inductive power transfer to prevent interference with NFC communications.

Numerous variations and enhancements of the above described wireless power transmission system 100 are possible, and the following teachings are applicable to any of such variations and enhancements.

As noted above, PRx controller/communications module 126 and PTx controller/communications module 126 may communicate with each other to respectively identify themselves to one another and to negotiate power delivery between them. This identification and negotiation process may be done in conjunction with a standard-defined protocol, such as protocols defined by the Wireless Power Consortium Qi standard, so that devices from different manufacturers can interoperate. Compliance with such a standard provides the benefit of interoperability at the potential expense of specialization. In other embodiments, the identification and negotiation process may be done in conjunction with a proprietary protocol determined by the manufacturer of the devices, which provides the benefit of improved flexibility and potentially extended performance, with the drawback of the loss of interoperability with devices that do not implement the proprietary protocol.

To address this dilemma, the controller/communications modules may be configured to initiate the negotiation process according to a standard-defined protocol. In the process of that negotiation, one, the other, or both devices may identify themselves—in a way that complies with the standard—as supporting an enhanced capability set that goes beyond the scope of the standard. If both devices are capable of operating in accordance with this enhanced capability set, the devices may choose to operate in accordance with the enhanced capability set. Otherwise, the devices may choose to operate in conjunction with the standards-based capability set. In one embodiment, the enhanced capability set may include the ability to operate at a different frequency, at different power levels, or in other ways that go beyond what is defined in an existing standard.

FIGS. 2A-2E illustrate an exemplary communication exchange between a wireless power receiver (PRx) 120 and a wireless power transmitter (PTx) 110 to migrate from a first communication protocol regime to a second regime including one or more enhancements specific to that second regime. In some examples the first protocol regime is a standards-based regime, such as Qi. Enhancements in the second regime may be either an extended or enhanced version of the standard (such as a latter version or an alternate version) or may be a completely separate and proprietary system. The various communication packets described may take any of a variety of forms, employing different packet structures, different modulation schemes for communicating the packets and the like. The following description addresses at a high level the components of the communication packets, but it will be appreciated that any particular protocol implementations may specify different or additional data that may be included in these packets as appropriate.

Figure 2A:
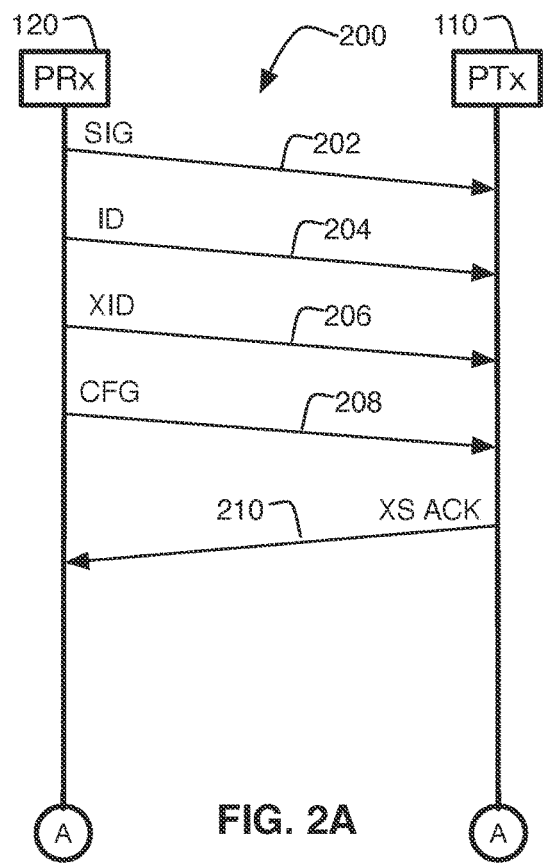
FIGS. 2A-2E illustrate a wireless power transfer negotiation to operate in an enhanced/extended wireless power transfer mode.

With reference to FIG. 2A, an exemplary negotiation process begins with PRx 120 sending a sequence of messages 202-208 to power transmitter 110. This exchange may be triggered by the PRx detecting that it is in proximity to a PTx, as is commonly implemented in wireless power transfer systems. The exchanges may take place using in-band communication at a frequency specified by the standard. In some embodiments, this frequency may be between about 100 kHz and about 250 kHz. In some embodiments, this frequency may be 128 kHz. In the illustrated example, the four messages 202-208 correspond to messages sent in accordance with the Qi standard; however, in some embodiments, there may be more or fewer messages, and they may comply with an alternative standard or protocol.

The first message 202 may be a SIG packet, i.e., a Signal Strength packet in accordance with the Qi standard. The second message 204 may be an ID packet, i.e., an Identification packet in accordance with the Qi standard. The third message 206 may be an XID, i.e., Extended Identification packet in accordance with the Qi standard. The fourth message 208 may be a CFG packet, i.e., a Configuration packet in accordance with the Qi standard. In some embodiments, these four packets may correspond to a "Ping" and "Configuration Phase" according to the Qi standard. Details of these packets, including the information contained therein and the effects of such packets in the system are described in detail in the Qi standard versions to which they pertain, and thus are not repeated here. It will be appreciated that various versions of the Qi standard may incorporate different versions of such packets, and that later versions may combine, eliminate, or otherwise changes such packets. Thus the illustrated packets are provided here merely as examples of a standards-compliant initialization, and other similar arrangements could also be used.

Of interest in the above-described communications is the XID packet. In the Qi standard, this optional packet may be used to provide additional information exchange between the PRx and PTx. This additional information exchange may include identification of enhanced capabilities, such as the ability to perform in accordance with an extension or enhancement to the standard or other extra-standard (i.e., beyond the scope of the standard) mode of operation. These performance modes not specified in the standard are described herein are referred to as extra-standard ("XS"). Thus, upon receiving a communication from the PRx that it is capable of performance in accordance with an extension or enhancement to the standard, the PTx may send a response packet 210 that is an XS ACK, i.e., an acknowledgement of the extra-standard capability of the PRx.

Figure 2B:
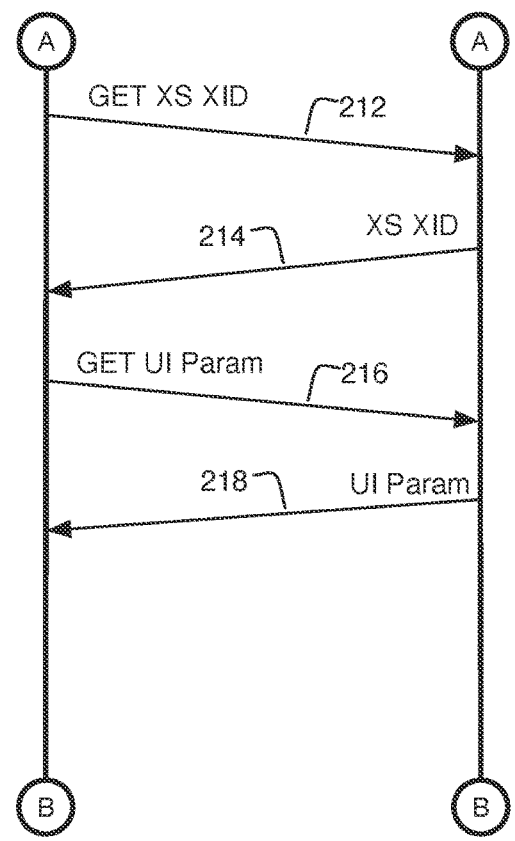

Turning now to FIG. 2B, further communication between the PRx and PTx is illustrated. Upon receiving from the PTx acknowledgement of the PRx enhanced (XS) capabilities, the PRx may send a further packet 212 requesting that the PTx provide its enhanced capabilities, if any. This may take the form of a "GET" request in which the PRx requests that the PTx send its enhanced capabilities, if any, in the form of an XS XID packet, i.e., a packet that is beyond the scope of the base standard and provides what extra capabilities beyond the standard the PTx is capable of providing. This packet may provide an indication of the various features beyond the scope of the base standard that the PTx can provide, such as different power transfer parameters (voltage, power level, operation frequency, etc.) as well as one or more parameters relating to the PTx that are necessary to operate in the enhanced (XS) mode.

As an example, the PTx may indicate that it is capable of operating at a different frequency beyond that defined in the base standard. In some cases the PRx may be configured to prefer operating at this different frequency if available, for example, to avoid potential interference with other devices or systems. As a result, the PRx may initiate a series of communications to transition from the present standards-compliant operating frequency to the different, extra-standard frequency. As part of this communication process, the PRx may also attempt to exchange other information about the power transfer, including user interface (UI related information) and information relating to other devices systems, such as the NFC system described above. To that end, the communications illustrated in FIG. 2B may continue with the PRx requesting UI related parameters (message 216) and the PTx reporting the requested UI related parameters (message 218).

As an example, it may be desirable to provide a user with feedback indicating the state or status of the wireless power transfer system. For example, it might be useful to provide a visual indication (such as an LED or colored LED) or an audio notification (such as a beep or chime) of a successful or unsuccessful power transfer arrangement. Depending on the particular devices used, either the PTx or the PRx may or may not have certain UI types available. For example, a charging pad may have status LEDs, but may not have a speaker that allows it to reproduce a chime. Other devices, such as a smart phone, may be able to provide audio and visual indicators. Likewise, other devices, such as a charging case may have limited UI capabilities. Thus, to provide the desired level of feedback to the user, the devices may need to negotiate amongst themselves to determine which device has the capabilities to provide the desired feedback to the user.

Figure 2C:
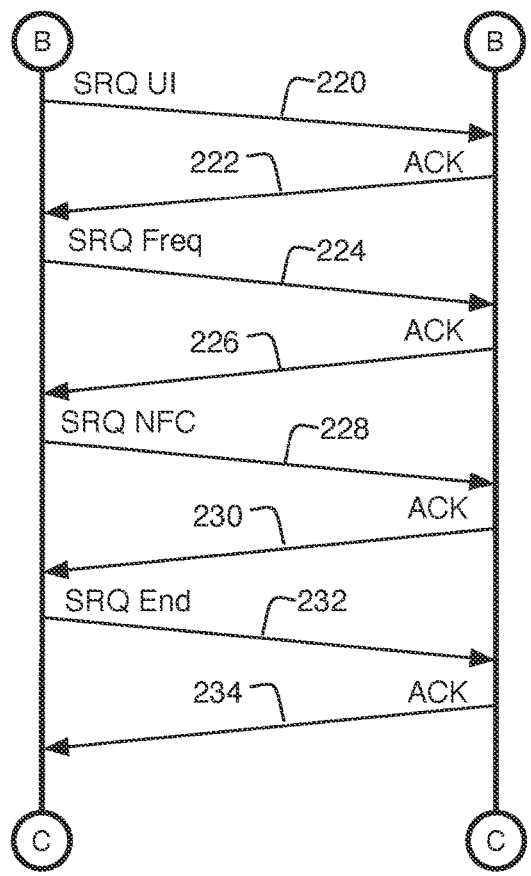

In the illustrated embodiment, it is the PRx that makes the decision as to which device will provide the required user feedback. Turning now to FIG. 2C, the PRx may communicate its determination, informed by its own capabilities and the capabilities received from the PTx in its XID packet, as to how various user interface issues will be handled. This may be communicated to the PRx by an SRQ UI (special request-user interface) packet 220. The PTx may acknowledge this request/instruction (ACK packet 222) and both devices may proceed accordingly. Similarly, the PRx may indicate a desired operating frequency via SRQ Freq packet 224 (special request-frequency). The PTx may acknowledge this request/instruction (ACK packet 224) and both devices may proceed accordingly to operate at a different frequency as described in greater detail below. Additionally, the PRx may use an SRQ NFC (special request-NFC) packet 228 request certain NFC parameters. These may include, for example, as a delay between deactivating the present power and communication exchange at the default/standard frequency and reactivating power and communication exchange at the optional frequency requested in packet 224, to allow for an NFC scan to take place, as described in greater detail below. The PTx may acknowledge this request/instruction (ACK packet 230) and both devices may proceed accordingly. Finally, the PRX may provide for additional special requests concomitant with the enhanced/extended protocols or may indicate an end to the special requests with SRQ End (special request-end) packet 232. The PTx may acknowledge this request/instruction (ACK packet 234) and both devices may proceed accordingly, e.g., to transition to the new frequency, provide the desired UI interactions, and allow for NFC operation as agreed in the foregoing exchange.

Figure 2D:
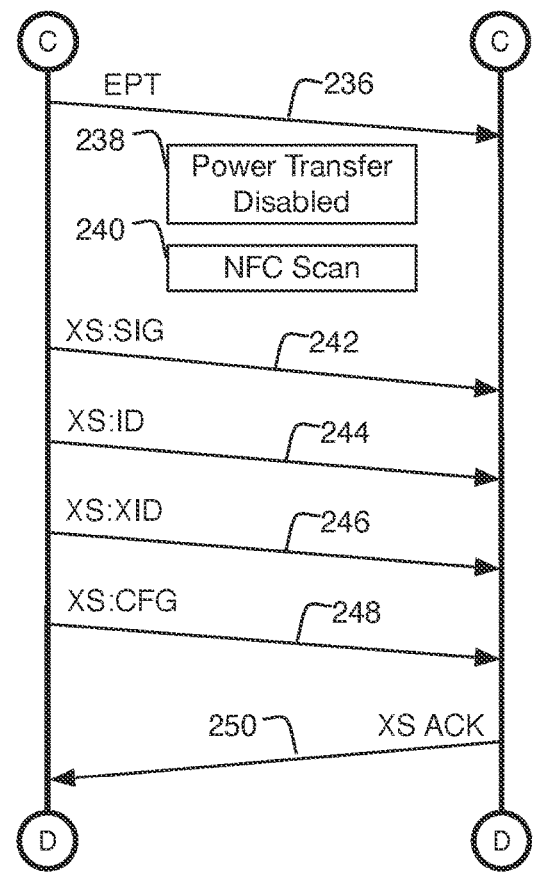

Turning now to FIG. 2D, the PRx may send an EPT (end power transfer) packet 236 in accordance with the original standard, e.g., the Qi standard. It will be appreciated that depending on the particular standard and version used, this packet may be different; however, the point of this instruction (and ending of the current power/data exchange regime) is to transition from operation in accordance with the original power transfer standard (e.g., at a standard-defined frequency) to power transfer in accordance with the enhanced/extended standard as negotiated in the preceding exchange (e.g., at a different frequency not in accordance with the original standard but in accordance with the enhanced standard). Thus, power transfer is disabled (238), which can also allow for time to perform a NFC scan, if negotiated (240). It is noted that, more generally speaking, other types of out of band communication can be utilized, such as Bluetooth and RFID communications. Further details of such an out of band communication, in this example a NFC scan, are discussed below.

Following the disabling of power transfer 238 and the optional NFC scan 240 (or other activities taking place during the negotiated delay), power transfer may be reinitiated in the enhanced mode, e.g., at a different frequency, beginning with the message exchange 242-248. In some embodiments, this re-initiation in the enhanced mode is responsive to successful communications between the PTx and PRx during the optional out of band communication period (e.g., NFC scan 240). In the illustrated embodiment, this begins with the PRX sending a series of messages compliant with the extended or enhanced standard ("XS") that otherwise match a basic pattern corresponding to the standards-compliant initiation or "Ping" conducted initially. As before, the exchanges may take place using in-band communication at a frequency specified by the extended or enhanced standard. In some embodiments, this frequency may be between about 360 kHz, although other frequencies may be used.

In the illustrated example exchange, the first message 242 may be an XS:SIG packet, i.e., a Signal Strength packet in accordance with an extended standard. The second message 244 may be an XS:ID packet, i.e., an Identification packet in accordance with the extended standard. The third message 246 may be an XS:XID, i.e., Extended Identification packet in accordance with the extended standard. The fourth message 248 may be a XS:CFG packet, i.e., a Configuration packet in accordance with the extended standard. In some embodiments, these four packets may correspond to a "Ping" and "Configuration Phase" generally paralleling the Qi standard. In other embodiments, the exchange may include more or fewer messages and may be entirely unique or may generally parallel other standards-based communication protocols. Thus, the illustrated packets are provided here merely as examples of a ping or initialization procedure, and other similar arrangements could also be used. In some embodiments this ping or initialization procedure may be used to confirm the parameters negotiated in the prior special request exchange described above.

Figure 2E:
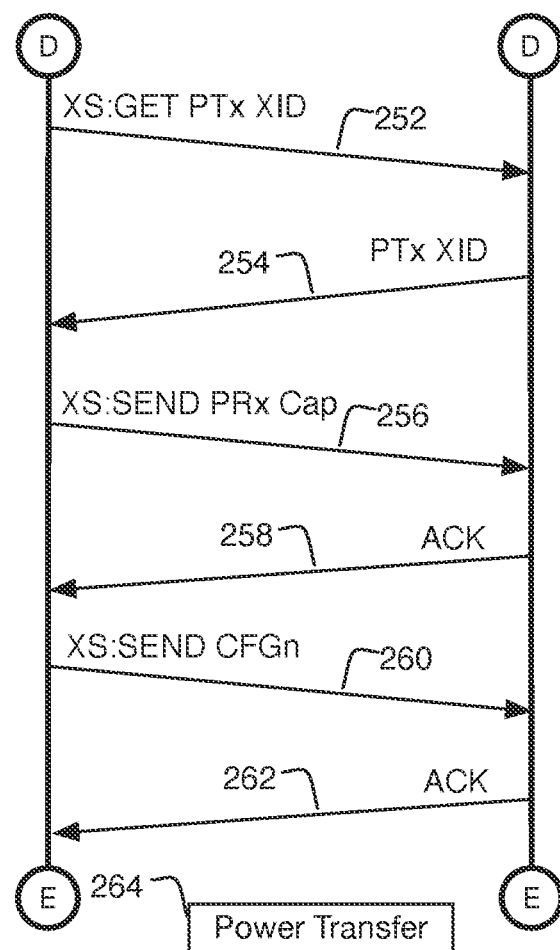

Turning now to FIG. 2E, establishing power transfer in accordance with the enhanced standard (e.g., at a different frequency) may require exchange of further information between the receiver and transmitter. Thus, the PRx may request extended identification information of the PTx using message/packet 252, XS:GET PTx XID (i.e., extended standard, get power transmitter extended identification information). In response, the PTx may provide the requested information via message/packet 254 PTx XID. The PRx may also provide to the PTX an indication of its own capabilities using message 256 XS:SEND PRx Cap (extended standard, send power receiver capabilities). This transmission may be acknowledged by the PTx with acknowledgement 258. Finally, there may be a further exchange in which the PRx sends one or more configuration packets, illustrated here by packet 260, XS: SEND CFGn (extended standard, send configuration n), with n being any of an essentially arbitrary number of packets required to exchange the required information. Each of these messages may be acknowledged by an acknowledgement message/packet 262. Upon culmination of the configuration exchange, power transfer in accordance with the enhanced standard may commence 264.

The foregoing message/packet exchange is exemplary. The extended standard (XS) communications may include more, fewer, or different message exchanges are required to establish power transfer in accordance with the various extensions of the underlying standard. Additionally, each message or packet may include various combinations of information necessary for the power contract negotiation between the receiver and transmitter. Additionally, although the illustrated process is shown as being driven by the receiver, in some embodiments, the transmitter (PTx) may determine various configuration parameters rather than relying on the receiver (PRx) to do so. Thus, the foregoing description should be considered as but one example of how to facilitate a transition from a standards-compliant wireless transfer mode to a wireless transfer mode that is based on an extension or enhancement to that standard.

FIG. 3 illustrates a simplified decision tree/flow chart 300 describing the receiver-side (PRx) transition from a standards-compliant wireless power transfer mode to a wireless power transfer mode in accordance with an extension or enhancement of such a standard (e.g., at a frequency no specified in the base standard). The process begins with "Ping Phase 302" in which the PRx and PRx initiate communication. This ping phase may, for example, correspond to the message exchange depicted above in FIG. 2A, which generally corresponds to the ping phase defined by the Qi standard, or may be any other suitable standards-based exchange. From this point, the process proceeds to block 304 in which the receiver reports its identification and extended identification information, again in a way that complies with the base standard. As outlined above, the extended identification information packet prescribed by the standard may allow for communication of capabilities beyond the scope of the standard. In block 308, the PRx may report/acknowledge receipt of configuration packets received from the PTx. In block 310, the PRx may determine if the PTx is capable of operating in conjunction with one or more enhancements or extensions that are desired by the PRx. If not, the process may proceed to block 312, in which base mode power transfer in conjunction with the standard is provided. Otherwise, if the PTx provided an acknowledgement of the extended/enhanced capabilities requested by the PRx, the system may transition to negotiating the extended mode power transfer 314 as described above, followed by a transition to the enhanced/extended mode in block 316.

FIG. 4 illustrates a simplified decision tree/flow chart 400 describing the transmitter-side (PTx) transition from a standards-compliant wireless power transfer mode to a wireless power transfer mode in accordance with an extension or enhancement of such a standard (e.g., at a frequency no specified in the base standard). The process begins with device detection 402, which may be provided by any number of sensors designed to detect that a PRx devices has been brought within range of the PTx. This leads to the digital ping stage 404 (corresponding to the Rx-side digital ping phase 302), discussed in greater detail above. Then, in block 406, the PTx receives an ID packet (406) and an XID packet (408) if expected based on the contents of the ID packet. All of these communications may be in compliance with an industry standard, as described above. In block 410, the PTx can determine whether an XID packet was received. If not, power transfer in the base mode (or a shutdown, as appropriate) may be entered (block 412). Alternatively, if an XID packet was received, the PTx may analyze the contents of the packet to determine whether the PRx is capable of operating in an enhanced/extended mode. If not, the PTx may transition to the base mode or disable power transfer (block 412). If so, the PTx may determine if the PRx has requested the base (standards-compliant mode) (block 416). If so, such mode may be entered. Alternatively, the PTx may receive the configuration phase packets (blocks 418/420), sent by the PRx in block 306 above. These packets may be acknowledged by the PTx (block 422) which may then determine (block 422) whether to restart and go to the ping phase or proceed to the extended/enhanced negotiation phase (block 426), corresponding to the receiver side negotiation phase in block 314.

Returning briefly to FIG. 2D, and as discussed above, after the negotiation phase during which the PRx and PTx agree to transition to a power transfer mode compliant with an extended/enhanced version of the standard that is different from the base standard (e.g, operating at a different frequency than those defined by the standard), the initially established standards power transfer may be disabled (block 238) before being reactivated in the extended/enhanced mode. In some embodiments, the exchange between PRx and PTx may include a delay before reactivation to allow time for NFC communication between PRx and PTx (e.g., as specified in the SRQ NFC block 228, discussed above). This delay may be provided because the power transfer can interfere with the NFC process, as they may use similar frequencies. Additionally the high power levels associated with wireless power transfer can, in some cases, cause damage to NFC equipment. Thus in the above-described negotiation process, the PRx and PTx can negotiate a time to allow for NFC scans.

The NFC communication may be used for any of a variety of purposes. For example, in some embodiments, the NFC communication may be used to provide PRx capabilities, properties, or parameters to the PTx, and vice-versa. These may be used to confirm the information provided in the various communications and negotiations described above. In other cases, the NFC communication may be used to provide information exchange that is not otherwise possible or feasible using the above-described techniques. In some embodiments, NFC communication may be used to read one or more NFC devices that are provided in either the PRx or PTx. These NFC tags may be used to perform additional functions, including but not limited to authentication, providing software/firmware updates delivered from PRx to PTx or vice-versa, confirmation of power parameters negotiated in the preceding stages, and the like.

Figure 5:
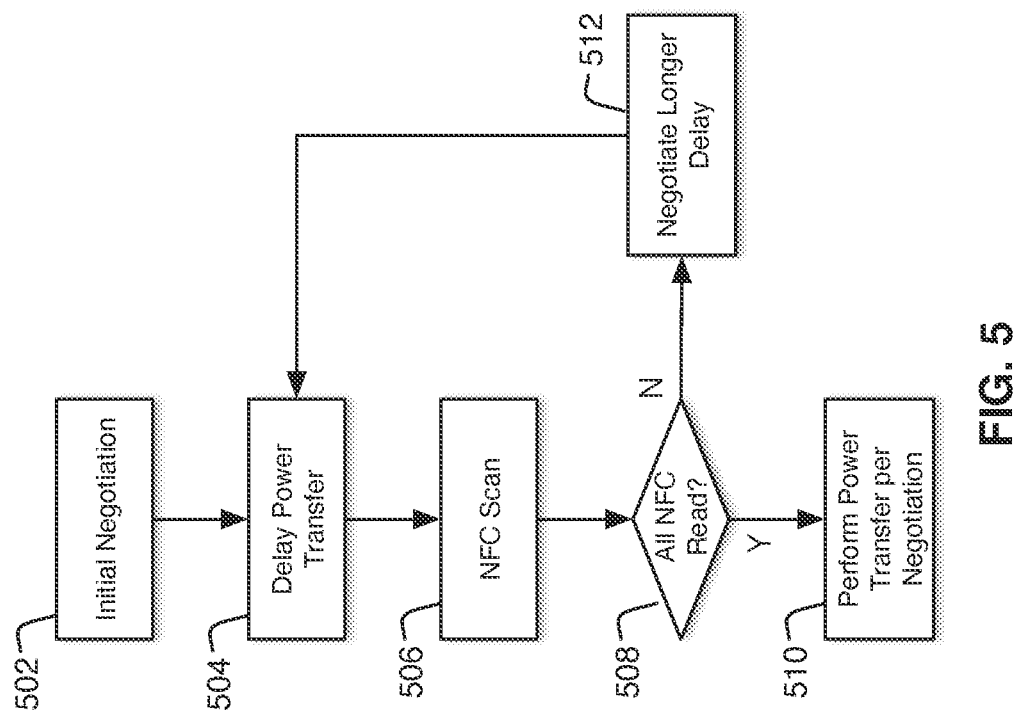
FIG. 5 illustrates a flow chart of an NFC scan process associated with an enhanced/extended wireless power transfer mode.

FIG. 5 illustrates a high level flowchart 500 of the NFC scan process. Beginning at block 502, the devices may perform their initial negotiation as described above, followed by a delay in power transfer (block 504) and NFS scan (506) as described above. The time period of the delay may be negotiated to account for the NFC functions to be performed. For example, relatively short tasks like authentication or confirmation of negotiated power transfer parameters may take a relatively short period of time. Alternatively, processes like firmware updates may take longer periods of time. The negotiated power transfer delay time may take these differences into account. Furthermore, if the devices originally specify a certain power transfer delay time period for the NFC scan, but during the subsequent NFC scan discover more devices that need to be read, they can negotiate for a subsequent, longer power transfer delay time period to allow sufficient time to scan all of the tags. For example, in block 508, it can be determined whether all NFC devices have been read. If so, power transfer may be enabled or reenabled (in accordance with the enhanced/extended power transfer mode) in block 510. Otherwise, the devices may negotiate a longer power transfer delay (block 512) to allow for further NFC scanning.

In addition to the foregoing, there may be some cases in which it is desirable to simplify the above-described negotiation process. As one example, a PRx device may have a dead battery, rendering it difficult or impossible to engage in a more protracted power contract negotiation process. In that case, the PRx device may indicate its preferred frequency in the XID packet described above with respect to FIG. 2A, element 206. Recall that, as described above, the XID packet was used to inform the PTx that the device was capable of various enhanced extra-standard power transfer modes. Instead, in this particular example, the PRx simply provides a preferred/desired power parameter (such as frequency of operation) and the PTx device will honor that, if possible.

Figure 6:
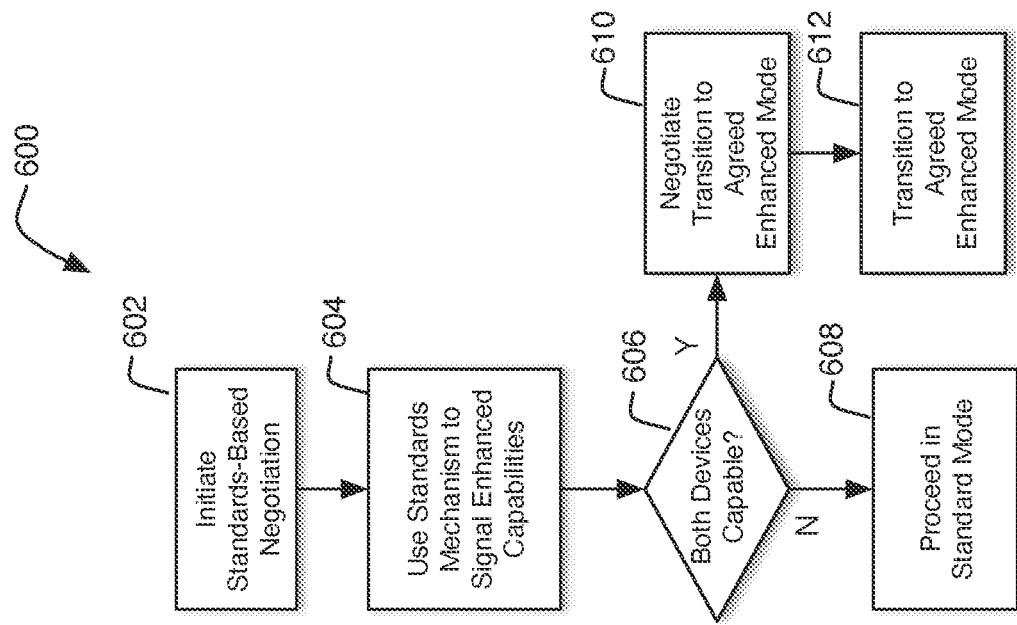
FIG. 6 illustrates a high level flow chart of a power transfer negotiation to operate in an enhanced/extended wireless power transfer mode.

FIG. 6 illustrates a high level flow chart of a power negotiation process 600 for extended or enhanced charging mode that remains compliant. The process may take place on either both devices as described more specifically above. The process can begin with initiating a standards-based negotiation in block 602. This negotiation may take place using standards-compliant mechanisms to ensure interoperability with devices that do not support the desired enhanced or extended capabilities. In some embodiments, these standards-compliant mechanisms may be provided by the Wireless Power Consortium Qi standard, or any other suitable wireless power transfer standard. However, in block 604, a standards-compliant mechanism may be used to signal enhanced capabilities. In some embodiments, this may include the "XID" (extended identification) packets provided for in the Qi standard and may optionally include additional mechanisms for exchanging the required information. In other embodiments, other standards-compliant mechanisms may be used as appropriate for a different version of the standard, or a different standard entirely. In block 606, the devices may determine whether both devices are capable of operation in compliance with the desired enhanced or extended modes or capabilities. If not, then the devices may proceed to operate in the standards-compliant mode, in which case wireless power transfer may take place according to the relevant standard (block 608).

Otherwise, if in block 606 it is determined that the devices are capable of operating in extended/enhanced modes beyond what is specified in the standard, the devices may negotiate a transition to a desired extended enhanced mode (block 610). These extended or enhanced modes may provide for power transfer in a way that is not compliant with the base standard, including, for example, operation at different frequencies, different voltages, different power levels, etc. Once an agreed enhanced or extended mode is agreed, then the devices may transition to and operate in accordance with this agreed enhanced or extended mode (block 612).

The foregoing describes exemplary embodiments of wireless power transfer systems that are able to negotiate enhanced/extended operating modes while remaining compliant with wireless power transfer standards that do not support such enhanced/extended operating modes. Such systems may be used in a variety of applications but may be particularly advantageous when used in conjunction with personal electronic devices such as mobile computing devices (e.g., laptop computers, tablet computers, smart phones, and the like) and their accessories (e.g., wireless earphones, styluses and other input devices, etc.) as well as wireless charging accessories (e.g., charging mats, pads, stands, etc.) Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient and non-damaging manner to facilitate battery charging. It is contemplated some implementers of the present technology may consider the passage of identifiers, such as serial numbers, UIDs, manufacturer IDs, MAC addresses, or the like, to aide in the identification of PTx's and PRx's, particularly their wireless capabilities, to one another.

Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system, and allow users to "opt in" or "opt out" of participation. For instance, such information may be presented to the user when they place a device onto a power transmitter.

It is the intent of the present disclosure that personal information data, if any, should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A wireless power receiver comprising:
a receiver coil configured to receive power from a wireless power transmitter;
a rectifier coupled to the receiver coil configured to convert an AC voltage appearing across the receiver coil to a DC voltage delivered to a load; and
a control and communications module coupled to the receiver coil and the rectifier,
wherein the control and communications module is configured to:
receive in-band communication signals from the wireless power transmitter via the receiver coil; and
operate the rectifier to generate in-band communication signals delivered to the power transmitter via the receiver coil;
wherein the in-band communication signals delivered to the power transmitter via the receiver coil include communications negotiating operation at an operating frequency selected from a plurality of operating frequencies.

2. The wireless power receiver of claim 1 wherein the in-band communications signals comply with a standard communication protocol.

3. The wireless power receiver of claim 2 wherein the in-band communication signals include communications negotiating operation at a power level selected from a plurality of power levels.

4. The wireless power receiver of claim 3 wherein a higher power level of the plurality of power levels corresponds to a higher operating frequency of the plurality of operating frequencies and a lower power level of the plurality of power levels corresponds to a lower operating frequency of the plurality of operating frequencies.

5. The wireless power receiver of claim 1 wherein the in-band communication signals include communications negotiating operation at a power level selected from a plurality of power levels.

6. The wireless power receiver of claim 1 further comprising an NFC communication module coupled to the control and communication module, wherein the in-band communication signals include communications negotiating a delay in wireless power transfer to permit NFC communication with a corresponding NFC communication module in the wireless power transmitter.

7. The wireless power receiver of claim 1 wherein the in-band communications include communications relating to a user interface capability of at least one of the wireless power transmitter and the wireless power receiver.

8. A wireless power transmitter comprising:
a transmitter coil configured to deliver power to a wireless power receiver;
an inverter coupled to the transmitter coil configured to convert an input voltage into an AC voltage delivered to the transmitter coil; and
a control and communications module coupled to the transmitter coil and the inverter,
wherein the control and communications module is further configured to:
receive in-band communication signals from the wireless power receiver via the transmitter coil;
operate the inverter to generate in-band communication signals delivered to the power receiver via the transmitter coil;
wherein the in-band communication signals received from the wireless power receiver include communications negotiating operation at an operating frequency selected from a plurality of operating frequencies.

9. The wireless power transmitter of claim 8 wherein the in-band communications signals comply with a standard communication protocol.

10. The wireless power transmitter of claim 9 wherein the in-band communication signals include communications negotiating operation at a power level selected from a plurality of power levels.

11. The wireless power transmitter of claim 10 wherein a higher power level of the plurality of power levels corresponds to a higher operating frequency of the plurality of operating frequencies and a lower power level of the plurality of power levels corresponds to a lower operating frequency of the plurality of operating frequencies.

12. The wireless power transmitter of claim 8 wherein the in-band communication signals include communications negotiating operation at a power level selected from among a plurality of power levels.

13. The wireless power transmitter of claim 8 further comprising an NFC communication module coupled to the control and communication module, wherein the in-band communication signals include communications negotiating a delay in wireless power transfer to permit NFC communication with a corresponding NFC communication module in the wireless power receiver.

14. The wireless power transmitter of claim 8 wherein the in-band communication signals include communications relating to a user interface capability of at least one of the wireless power transmitter and wireless power receiver.

15. A method of negotiating wireless power transfer between a device that is a wireless power transmitter or a wireless power receiver and a counterpart device, the method comprising:
initiating communication with the counterpart device;
communicating one or more capabilities of the device to the counterpart device, the one or more capabilities including a capability to operate at a plurality of operating frequencies; and
determining whether the counterpart device is capable of operating at each of the plurality of operating frequencies; and
selecting a first operating frequency from among the plurality of operating frequencies if the counterpart device is capable of operating at the first operating frequency; or
selecting a second operating frequency from among the plurality of operating frequencies if the counterpart device is capable of operating at the second operating frequency but is not capable of operating at the first operating frequency.

16. The method of claim 15 wherein the communications between the device and its counterpart are in-band communications in compliance with a standard communication protocol.

17. The method of claim 16 wherein the capabilities include an ability to operate at a plurality of power levels.

18. The method of claim 17 wherein each of the plurality of power levels corresponds to one of the plurality of operating frequencies.

19. The method of claim 15 wherein the capabilities include NFC communications capabilities.

20. The method of claim 15 wherein the capabilities include user interface capabilities.

21. The method of claim 20 wherein an agreed mode between the wireless power transmitter and wireless power receiver includes an agreement as to which device will provide information about a state of wireless power transfer to a user.

* * * * *